United States Patent [19]
Wilson

[11] Patent Number: 5,952,119
[45] Date of Patent: Sep. 14, 1999

[54] FUEL CELL MEMBRANE HUMIDIFICATION

[75] Inventor: Mahlon S. Wilson, Los Alamos, N.M.

[73] Assignee: Regents of the University of California, Los Alamos, N.M.

[21] Appl. No.: 08/810,119

[22] Filed: Feb. 24, 1997

[51] Int. Cl.[6] .................................................. H01M 2/00
[52] U.S. Cl. .................................. 429/34; 429/41; 429/42
[58] Field of Search .................................. 429/41, 42, 34

[56] References Cited

U.S. PATENT DOCUMENTS

| | | | |
|---|---|---|---|
| 3,905,832 | 9/1975 | Trocciola | 136/86 |
| 4,818,637 | 4/1989 | Molter et al. | 429/15 |
| 4,876,115 | 10/1989 | Raistrick | 427/115 |
| 5,211,984 | 5/1993 | Wilson | 427/115 |
| 5,234,776 | 8/1993 | Koseki | 429/30 |
| 5,234,777 | 8/1993 | Wilson | 429/33 |
| 5,618,392 | 4/1997 | Furuya | 204/252 |
| 5,641,586 | 6/1997 | Wilson | 429/30 |

OTHER PUBLICATIONS

M. Watanabe et al., "Management of the Water Content in Polymer Electrolyte Membranes with Prorous Fiber Wicks," 140 J. Electrochem. Soc., No. 11, pp. 3190–3193 (Nov. 1993).

*Primary Examiner*—Maria Nuzzolillo
*Assistant Examiner*—Laura Weiner
*Attorney, Agent, or Firm*—Ray G. Wilson

[57] ABSTRACT

A polymer electrolyte membrane fuel cell assembly has an anode side and a cathode side separated by the membrane and generating electrical current by electrochemical reactions between a fuel gas and an oxidant. The anode side comprises a hydrophobic gas diffusion backing contacting one side of the membrane and having hydrophilic areas therein for providing liquid water directly to the one side of the membrane through the hydrophilic areas of the gas diffusion backing. In a preferred embodiment, the hydrophilic areas of the gas diffusion backing are formed by sewing a hydrophilic thread through the backing. Liquid water is distributed over the gas diffusion backing in distribution channels that are separate from the fuel distribution channels.

9 Claims, 11 Drawing Sheets

FUEL CELL MEMBRANE HUMIDIFICATION

This invention relates to fuel cells and, more particularly, to fuel cells having polymer electrolyte membranes. This invention was made with government support under Contract No. W-7405-ENG-36 awarded by the U.S. Department of Energy. The government has certain rights in the invention.

BACKGROUND OF THE INVENTION

A fuel cell, as used herein, provides for the direct production of electrical energy through an electrochemical reaction involving fuel and gas reactants, which may be typically hydrogen and oxygen. A single cell comprises an anode structure, cathode structure, and an electrolyte separating the electrodes. A particular form of electrolyte is a polymer electrolyte membrane for ionic transport between the electrodes.

One of the primary challenges in attaining an optimal performance of polymer electrolyte membrane fuel cells is attaining effective hydration of the ionomeric membrane structure. At less than ideal hydration levels, the water content of the ionomer drops with a concomitant decrease in the ionic conductivity. In the case of fuel cells, the kinetics of the oxygen reduction reaction (ORR) at the cathode are also adversely affected by a decrease in water content.

Maintaining a high hydration level at all times throughout the membrane/electrode assembly (MEA) is difficult in fuel cells for a number of reasons. For example, at low current densities or at open circuit, when little liquid water is produced by the ORR, the MEA hydration level will tend to drop even when the reactant gases are at saturated water vapor conditions because the water uptake of perfluorosulfonate membranes is less when a membrane is vapor equilibrated rather than liquid equilibrated. On the other hand, at higher current densities, the electro-osmotic drag of water with the ionic flux from the anode to the cathode across the membrane tends to dry out the anode. An additional problem is that the cathode then tends to flood because of the ORR generated water as well as the water dragged across the membrane. In general, it is difficult to maintain optimum hydration levels under all operating conditions.

Under certain conditions, the water produced in the ORR reaction is sufficient to maintain adequate hydration. It is still difficult to maintain adequate performance outside of a particular operating envelope, which typically does not include low current densities, typical operating temperatures (80–90° C.), or near ambient reactant pressures, without humidification of at least the anode region. Some approaches to humidification systems or to humidification control entail some means of introducing humidification plates within the individual cells. In a further evolution of this approach, International Fuel Cells (IFC, South Windsor, Conn.) uses water permeable bipolar plates to recover the water from the cathode plenums and directly humidify an anode plenum of an adjacent cell.

In most other polymer electrolyte fuel cell technologies, the water is supplied to the cell by humidifying the reactant gas streams. In several types of commercial fuel cell stacks, the gas streams are humidified by flowing the reactants through a humidity exchanger. The exchanger and its associated control system tend to increase system size and complexity.

Control of the stack is also complicated if the cells are humidified via the reactant streams because the two systems then become coupled. Often, the optimal hydration level may not match the most efficient reactant flowrate, and it may be difficult, for example, to switch-off the cathode humidification if the cell starts to flood, or to increase the humidification level at low current densities when the cell starts to dry out as less water is produced by the ORR. This lack of water is further exacerbated by the tendency of the membrane to take up less water when only vapor humidified. For such reasons, it is difficult to provide optimal (and not excessive) hydration over all current densities with a particular set-up.

One approach to alleviate these difficulties is to supply sufficient liquid water directly to the membrane in some manner to de-couple the humidification and reactant supply subsystems and maintain the ionomer at the liquid-equilibrated hydration level at all times. In general, the best way of decoupling hydration from the other subsystems and assure liquid-equilibrated hydration levels is to introduce liquid water directly to the MEA, as has been done previously by wicking from the periphery through the ionomeric membrane, or to inject water from the periphery through miniature tubes formed in the membrane. In the former case, Watanabe et al. (J. Electrochem. Soc., 140, 3190 (1993)) introduces liquid water to the membrane directly through a supply reservoir at the periphery of the electrode. Since the standard perfluorosulfonate membranes do not wick water particularly well, Watanabe et al. teach a composite layer within the membrane that consists of the ionomer for ionic conductivity and a wicking material to facilitate the transport of the water. Performance improvements over reactant humidification are demonstrated in small cells. In the other liquid hydration approach, Lynntech, Inc. (College Station, Tex.) impresses miniature channels into conventional perfluoroionomer membranes and injects water from the edge through the tubes thus formed. In these configurations it may be difficult to wick or pump the water a substantial distance. The membranes need to be relatively thick and currently available membranes and MEAs can not be directly utilized.

Accordingly, it is an object of the present invention to supply liquid water to the polymer electrolyte membrane of a fuel cell using generally available fuel cell components and without affecting the active area of the components.

Another object of the present invention is to provide a relatively simple membrane humidification system for use with a fuel cell.

One other object of the present invention is to uniformly distribute liquid water to a surface of a membrane.

Yet another object of the present invention is to decouple control of membrane humidification from control of reactant flow rate.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a polymer electrolyte membrane fuel cell assembly having an anode side and a cathode side separated by the membrane and generating electrical current by electrochemical reactions between a fuel gas and an oxidant. The anode side comprises a hydrophobic gas diffusion backing contacting one side of the membrane and having hydrophilic areas therein for providing liquid water directly to the one side of the membrane through the hydrophilic areas of the gas diffusion backing. In a preferred embodiment, the hydrophilic areas of the gas diffusion backing are formed by sewing a hydrophilic thread through the backing. Liquid water is distributed over the gas diffusion backing in distribution channels that are separate from the fuel distribution channels.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

In accordance with the present invention, a wicking configuration delivers liquid water to the MEA through the otherwise hydrophobic backing from a liquid water source in the anode plenum. In this manner, a continuous supply of water can be provided over the entire active area of the MEA because there are no space constraints as when the membrane serves as the water conduit. In order to convey the water from the anode plenum to the membrane, a two-part hydrophilic/hydrophobic backing structure is used.

Figure 1:
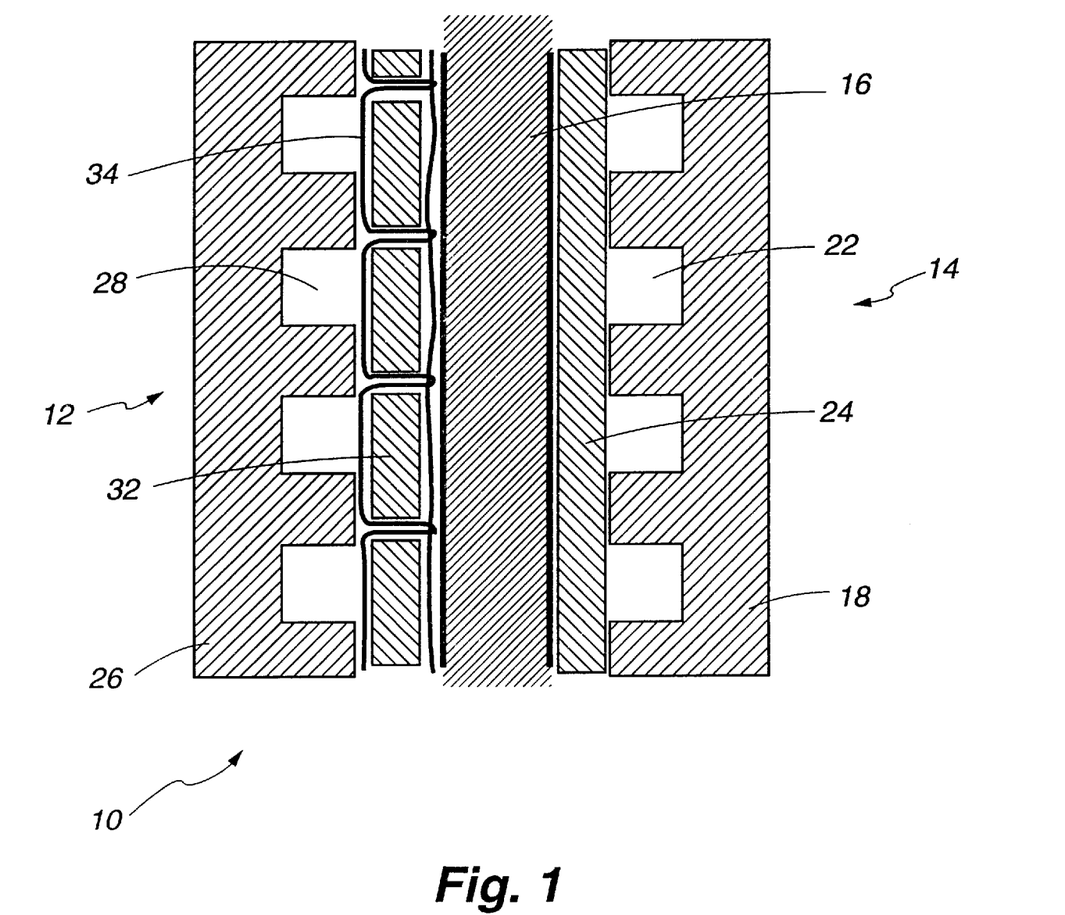
FIG. 1 is an exploded cross-sectional view of a unit fuel cell according to one embodiment of the present system.

A preferred embodiment for the two-part structure is shown in FIG. 1 in exploded cross-section (not to scale). A unit fuel cell 10 is formed with anode side 12 and cathode side 14 separated by catalyzed membrane 16. Cathode side 14 comprises flow field plate 18 with oxidant feed channels 22 and hydrophobic gas diffusion backing 24 adjacent one surface of catalyzed membrane 16. Anode side 12 comprises flow field plate 26 with fuel distribution channels 28 and hydrophobic gas diffusion backing 32 adjacent a second side of catalyzed membrane 16. A two-part hydrophobic/hydrophilic structure is formed by wicking thread 34 that has been sewn through conventional hydrophobic gas diffusion backing 32 to supply the hydrophilic component for anode side 12.

A number of materials may be used for the backings 24, 32 such as PTFE treated carbon paper, as is frequently used, or, preferably, a carbon black/PTFE filled carbon cloth gas-diffusion electrode such as non-catalyzed ELAT, from E-TEK, Inc. (Natick, Mass.). With an exemplary serpentine thread pattern for wicking thread 34, with each stitch about 2 mm long and the rows separated by about 2 mm, two threads convey water toward the membrane about every 2 mm. The actual region of membrane 16 that is in contact with wick 34 is even greater because of the portion of wick 34 stitches that overlie backing 26 on both sides. This allows take-up and delivery of the liquid water over a greater area.

In one embodiment, liquid water is supplied from direct injection of water droplets in fuel gas channels 28 (see FIG. 2) or from separate water-filled channels in the anode plate (see FIG. 7A, 7B, and 8) that may be arrayed in a number of configurations. At only about 80 $\mu$m in diameter, wicking thread 34 is readily impressed into the originally 350 $\mu$m thick gas diffusion backing 32. Upon compression of unit cell 12 during assembly, backing 32 deforms sufficiently to close the needle holes and accommodate wicks 34 to provide good interfacial contact of the various materials.

Wicking 34 can be sewn into conventional, catalyzed gas diffusion backings 32 that are then impregnated with ionomer and hot-pressed to membrane 16 (e.g., I. D. Raistrick, U.S. Pat. No. 4,876,115, incorporated herein by reference). Because of the higher catalyst utilization efficiencies and robust performance, catalyzed membranes 16 (or MEAs) are used and prepared in accordance with U.S. Pat. Nos. 5,211,984 and 5,234,777, both incorporated herein by reference. As such, the platinum catalyst loading of membrane 16 is in the neighborhood of only 0.12 mg $Pt/cm^2$/electrode. A loading as low as 0.03 mg $Pt/cm^2$ has been shown to be effective on anode side 12. Membranes 16 with symmetrical loading are used in the examples herein. Low platinum loading catalyzed membranes, such as GORE-PRIMEA from W.L. Gore & Assoc., are also commercially available.

A first exemplary embodiment of a unit fuel cell according to the present invention comprised a standard 5 $cm^2$ catalyzed Nafion 115 membrane (DuPont) using standard E-TEK gas-diffusion backings in conventional hardware. The only difference between this cell and a conventional cell is that wicking material 34 was sewn into anode backing 32 in a top-stitch using a conventional sewing machine. The thread was sewn in a serpentine pattern with roughly 2 mm between stitches and between rows. The wick material was a continuous multi-filament polyester thread that is about 80 $\mu$m in diameter available as U151 from Güntermann of America.

Figure 2:
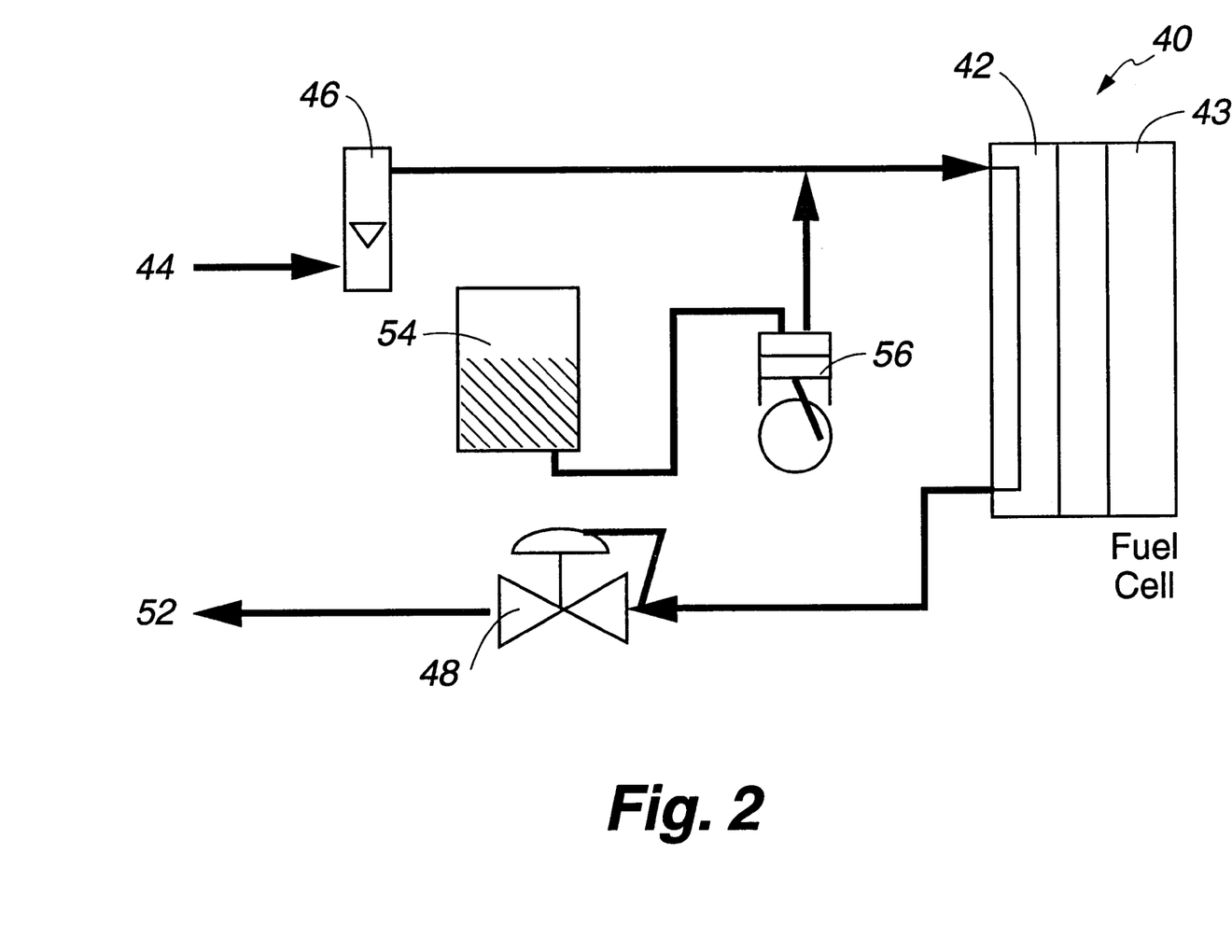
FIG. 2 is a schematic of one water injection system for introducing liquid water into the anode side of a unit fuel cell.

FIG. 2 schematically depicts an experimental apparatus for injecting liquid water directly into a unit fuel cell 40. Fuel gas 44, $H_2$, is input to fuel cell 40 through meter 46. Any unreacted gas and accumulated water forms output 52, which is output from fuel cell 40 through back-pressure regulator 48 to control flow through anode side 42 of cell 40. Liquid water is contained in reservoir 54 and injected into fuel gas 44 by a controllable pump 56, which may be any convenient injection device, such as a piston pump, positive displacement pump, syringe pump, or the like.

A droplet of water was introduced each second into the anode 42 reactant inlet. Total water flow rate was about 1.5 ml/min with no reactant humidification. The wicking backing was used only on anode side 42 because of the tendency of the anode side 42 to dry out and the preponderance of water at the cathode side 43 (due to the cathode reaction) at higher current densities.

Figure 3:
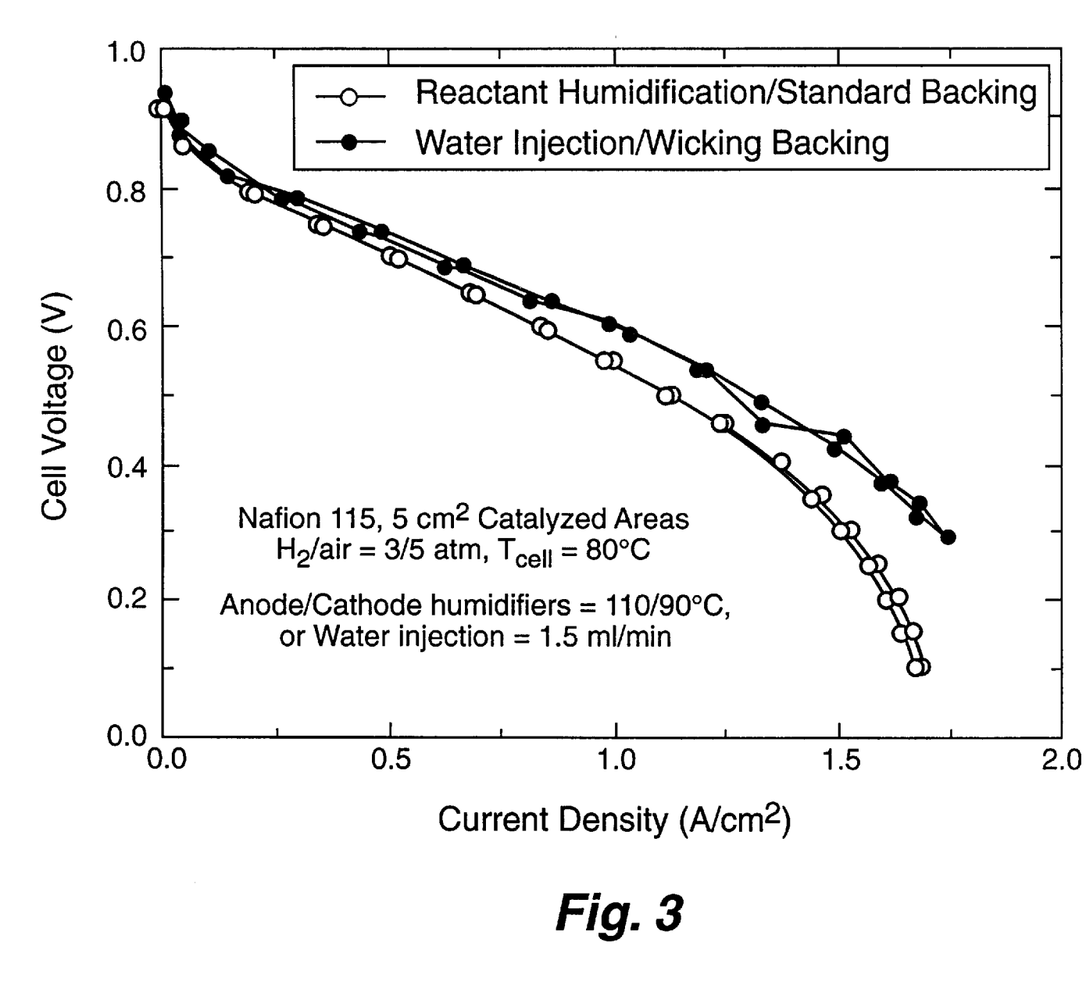
FIG. 3 is a performance comparison of conventional fuel gas humidification with liquid water injection into a fuel gas stream according to the present invention.

FIG. 3 depicts polarization curves for two basic fuel cells with membranes of Nafion 115; one configured with an anode wicking backing (closed circles) as shown in FIG. 1 and the other a conventional cell (open circles) with conventional reactant humidification. The cell with the wicking backing outperformed the conventional cell over the entire current density range even though the latter had relatively aggressive humidification conditions (anode and cathode humidifiers at 110 and 90° C., respectively). Not only was the performance higher at the low current densities where the higher hydration conditions improves the ORR, but it was also greater at the higher ranges where the non-humidified cathode gases used in the wicking scheme probably improved the mass transport of the oxygen.

Figure 4:
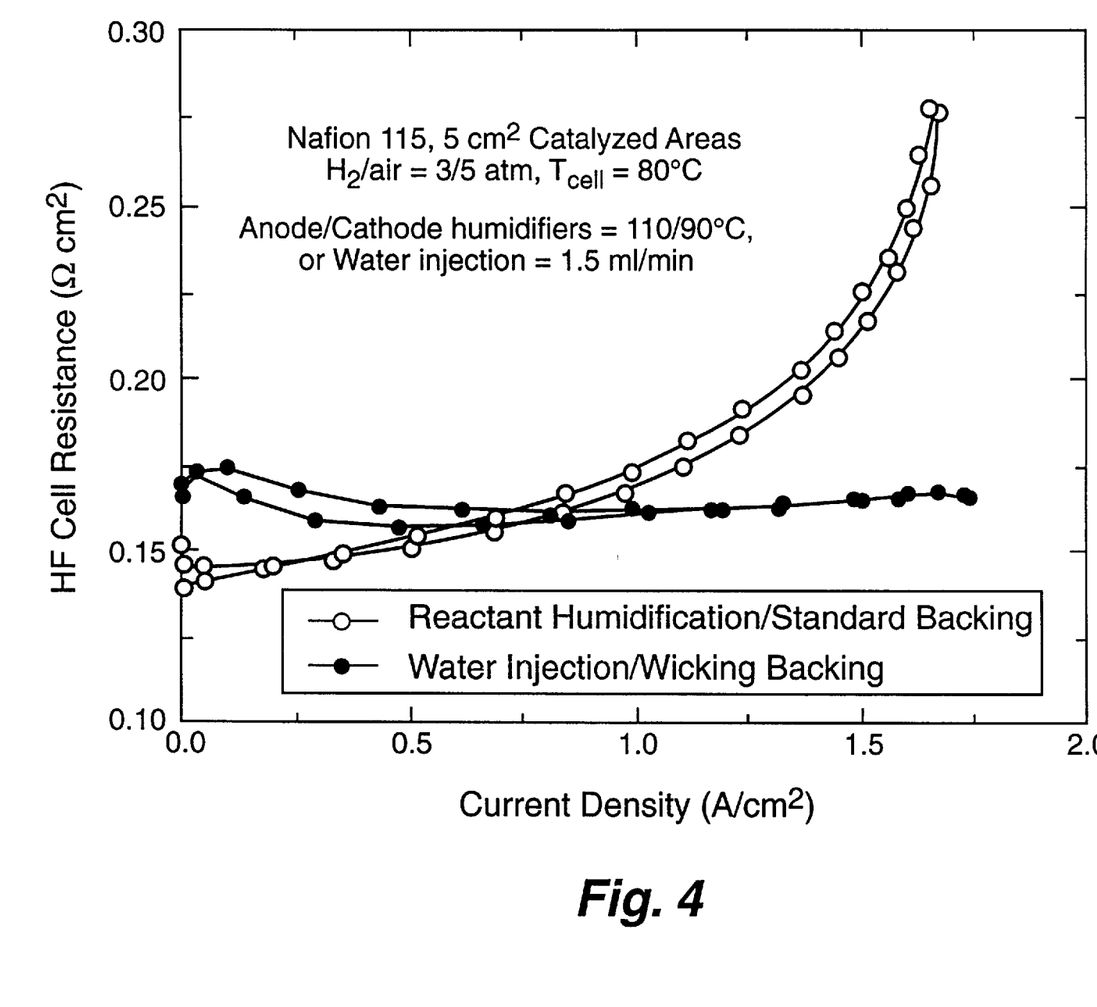
FIG. 4 illustrates high frequency cell resistance comparisons of the fuel cells used to obtain FIG. 3.

The most dramatic difference in the two humidification techniques is shown in FIG. 4, which depicts the high frequency (8 kHz) cell resistance for the two cells having the characteristics shown in FIG. 3. As commonly observed, the resistance of the conventionally humidified cell (open circles) is much greater at the higher current densities where the anode side of the membrane tends to dry out due to the electro-osmotic drag of water away from this side. The results with water injection according to the present invention (closed circles) shows relatively constant, and ultimately much lower, cell resistance. It is evident that the droplets of injected water are contacting the plenum side of the wicking thread, where the water is carried across the backing to supply the membrane directly with liquid water. While improving the cell performance is obviously desirable, it is important to note that a much simpler and energy effective hydration scheme is realized than with reactant humidification.

One of the difficulties with the exemplary off-the-shelf polyester thread used above was that it lost hydrophilicity with time in the cell. When examined under the microscope, the thread appeared intact and no damage or degradation was apparent. The surface of the inherently hydrophobic polyester probably annealed, resulting in a loss of the surface functionality that provided the originally hydrophilic nature. The hydrophilicity of the polyester thread has been stabilized by first passing the thread through Nafion solution (Solution Technology, Inc., Mendenhall, Pa.), a solubilized form of the commercial perfluorosulfonate ionomer, followed by drying. While Nafion is chosen for its chemical stability, other approaches are expected to result in more hydrophilic surfaces with greater wicking capacities, such as using other types of threads (e.g., polymer blends or special polymer fibers) or other coatings (e.g., polyaniline or polypyroleo.

Figure 5A:
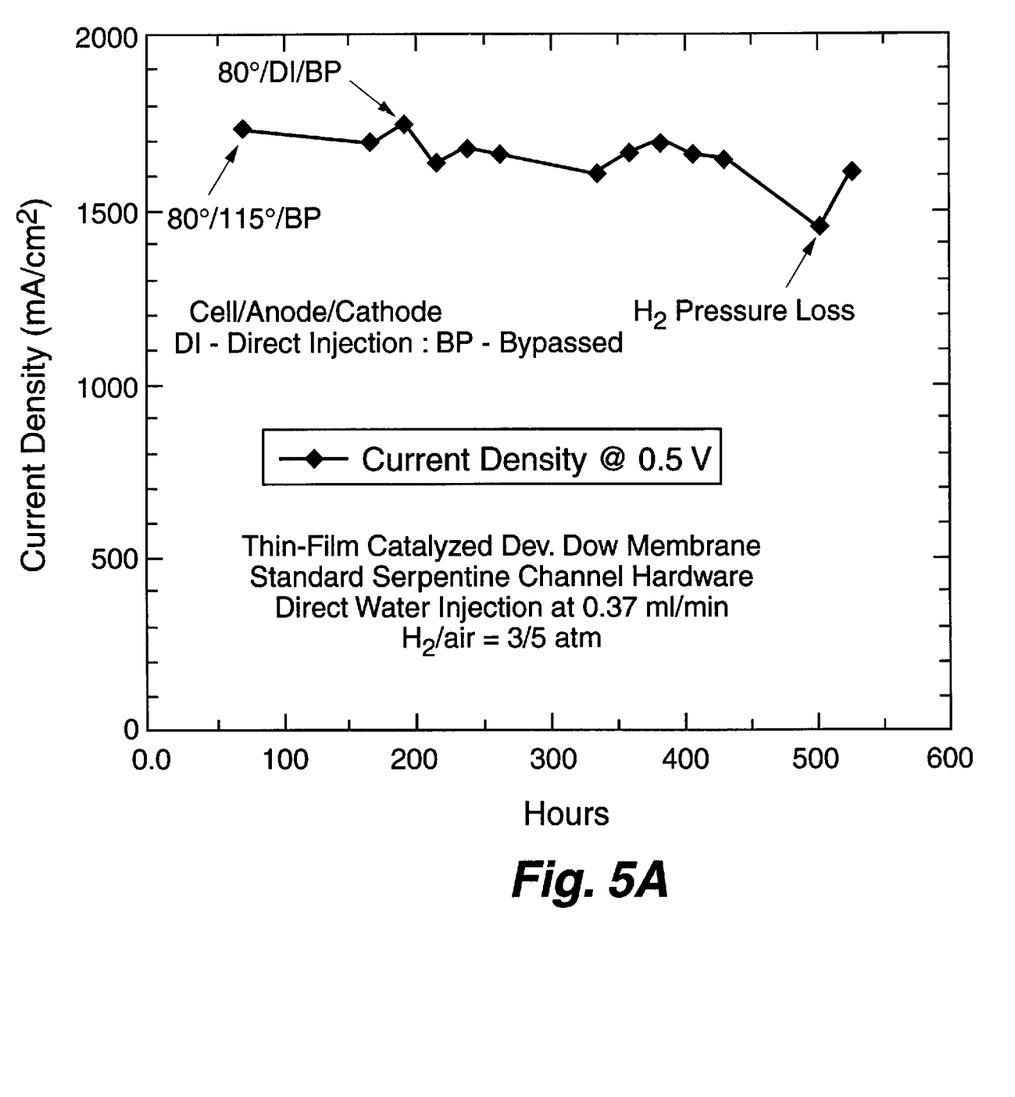
FIGS. 5A and 5B graphically depict performance parameters under a life test of a fuel cell with water injection into the fuel gas stream according to the present invention.
Figure 5B:
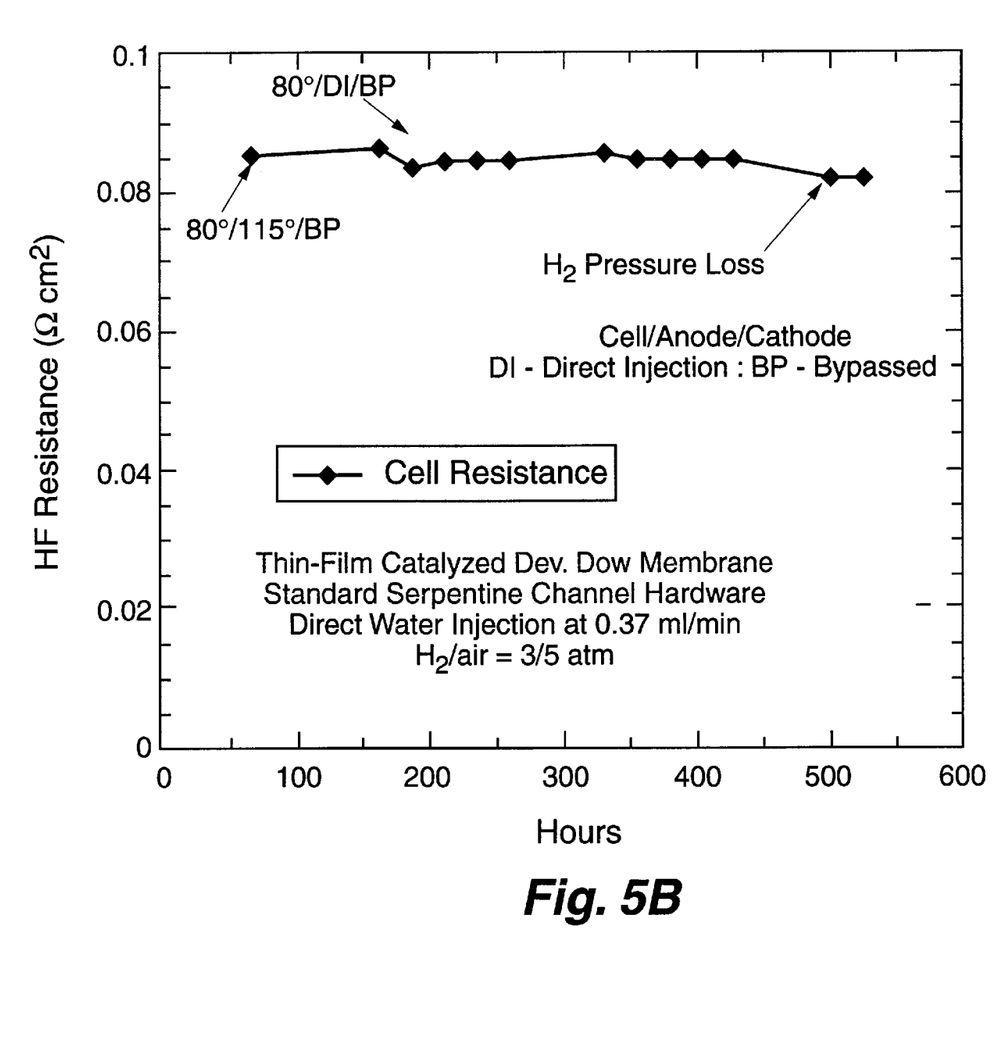

Using threads treated with Nafion, cells were prepared similar to the one shown in FIG. 1 above. The life test performance of one such cell using a higher performance, developmental membrane from Dow was operated continuously at 0.5 V, as shown in FIG. 5A. Initially, aggressive anode humidification (humidifier temperatures substantially over cell temperatures results in considerable condensation in the cell) was sufficient to maintain good hydration with the wicking backing. Nevertheless, direct water injection was eventually started at 0.37 ml/min. Eventually, the life test was terminated after the hydrogen feed was lost and the cell started to demonstrate some anomalous behavior. A slight loss in current density was observed over the 500 hours. This loss was probably not due to cell humidification, since FIG. 5B demonstrates that the high frequency cell resistance only improved over this time, so the membrane was clearly well hydrated.

Figure 6:
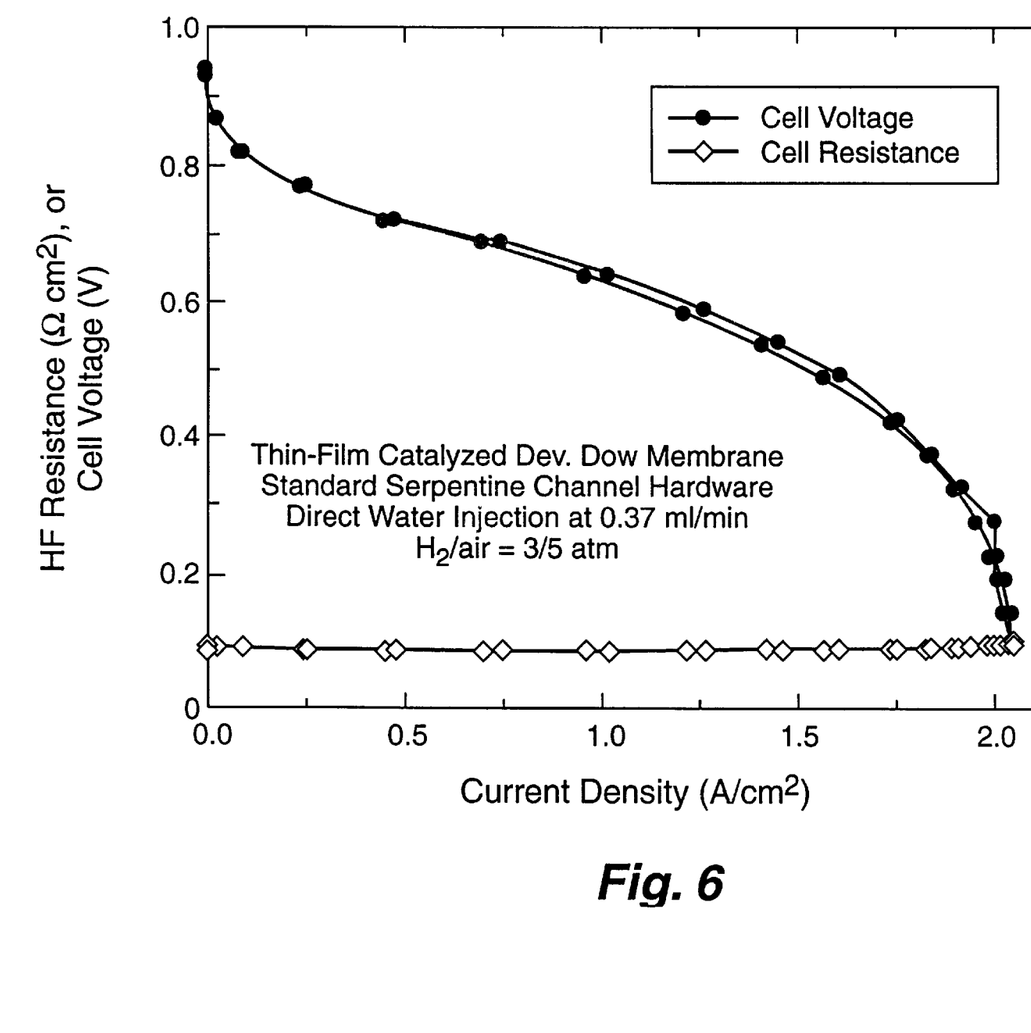
FIG. 6 illustrates performance characteristics of a fuel cell with direct water injection but having a different polymer electrolyte membrane than the membrane used to generate performance curves shown in FIGS. 1 and 2.

Cell performance of fuel cells that included wicking anode backings with the developmental Dow membrane is again equal or superior to the conventional fuel cell configuration with such membranes. In addition, the wicking system allows operation at cell temperatures considerably higher than the typical 80–90° C. FIG. 6 depicts the polarization and high frequency resistance curves for one such cell operating at 115° C. without any difficulty. The cell resistance is very close to that observed at normal operating temperatures (i.e., roughly at 0.08 $\Omega$ cm$^2$ as depicted in FIG. 6), which is not normally attained with vapor humidified cells at these higher temperatures.

These embodiments clearly demonstrate the concept of providing direct liquid hydration of the membrane using a "hydrophiliciphobic" wicking backing where droplets of liquid water were injected directly into the reactant flowstream. This approach would be difficult to implement in a fuel cell stack and obtain uniform water distribution. Most applications probably would require a combination of the wicking backing with an anode flow-field configuration that would continuously supply the liquid water directly to the wicking backing. In general, separate channels may be provided for liquid water and for the anode gasses, which can be done a number of different ways.

Figure 7A:
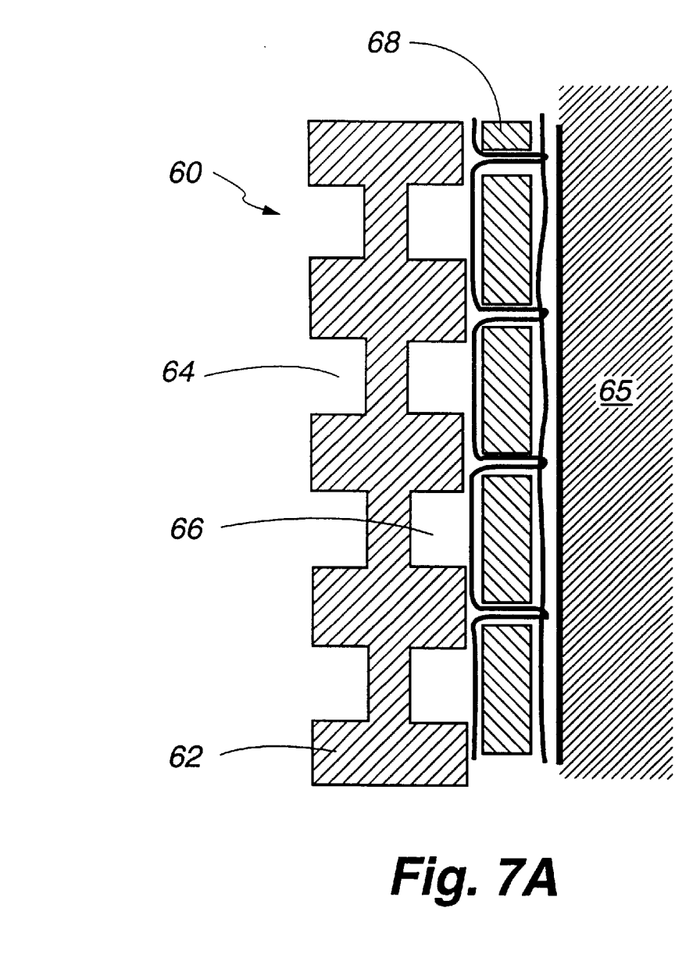
FIGS. 7A and 7B are exploded cross-sections of flow fields for use in the anode plenum of fuel cells with liquid water injection according to the present invention.
Figure 7B:
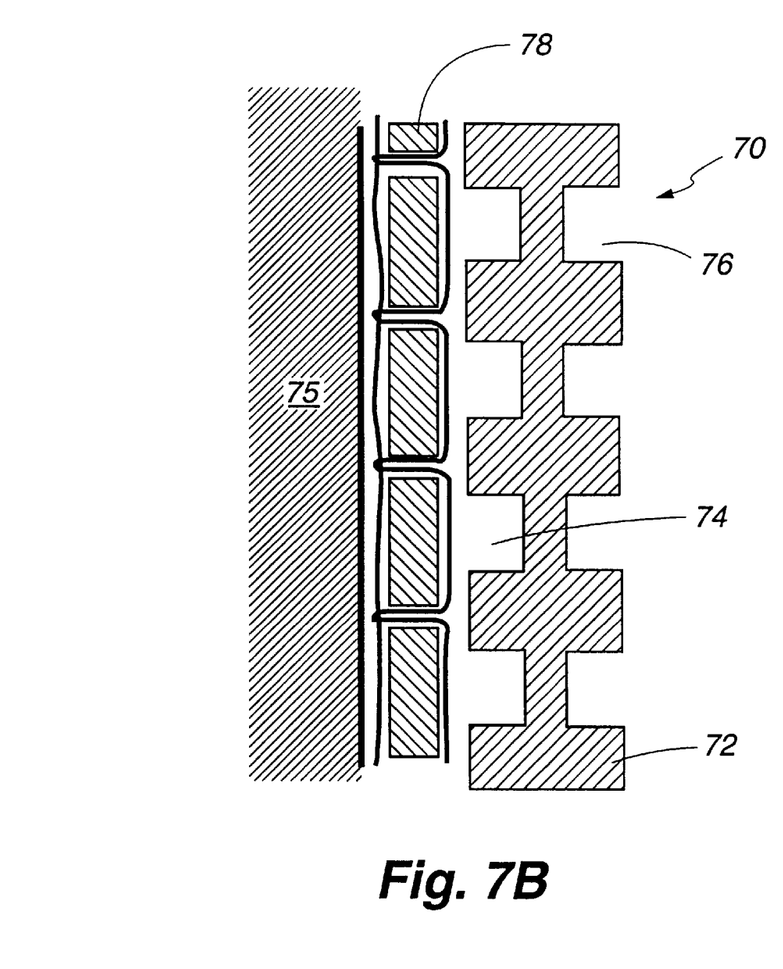

On the 5 cm$^2$ active area level, as shown in FIGS. 7A and 7B, sets of channels (water channels 64 and fuel gas channels 66 for fuel cell anode side 60; water channels 74 and fuel gas channels 76 for fuel cell anode side 70) can be formed into either side of a porous, electronically conductive carbon paper 62, 72 (i.e. Spectracarb from Spectracorp, Ltd., Lawrence, Mass.) adjacent wicking backings 68, 78, respectively. The anode gas (i.e., hydrogen) and liquid water are manifolded to the opposing faces of the paper, and the porous material is rendered either hydrophilic (porous material 62) if the water channels are on the far side or hydrophobic (porous material 72) if the water channels are against the wicking backing 68 and 78, respectively. The former configuration tends to collect water in the hydrogen channels, which leads to erratic performance and the latter provides results that are similar to those shown in FIGS. 3 and 4 on the 5 cm$^2$ scale.

Figure 8:
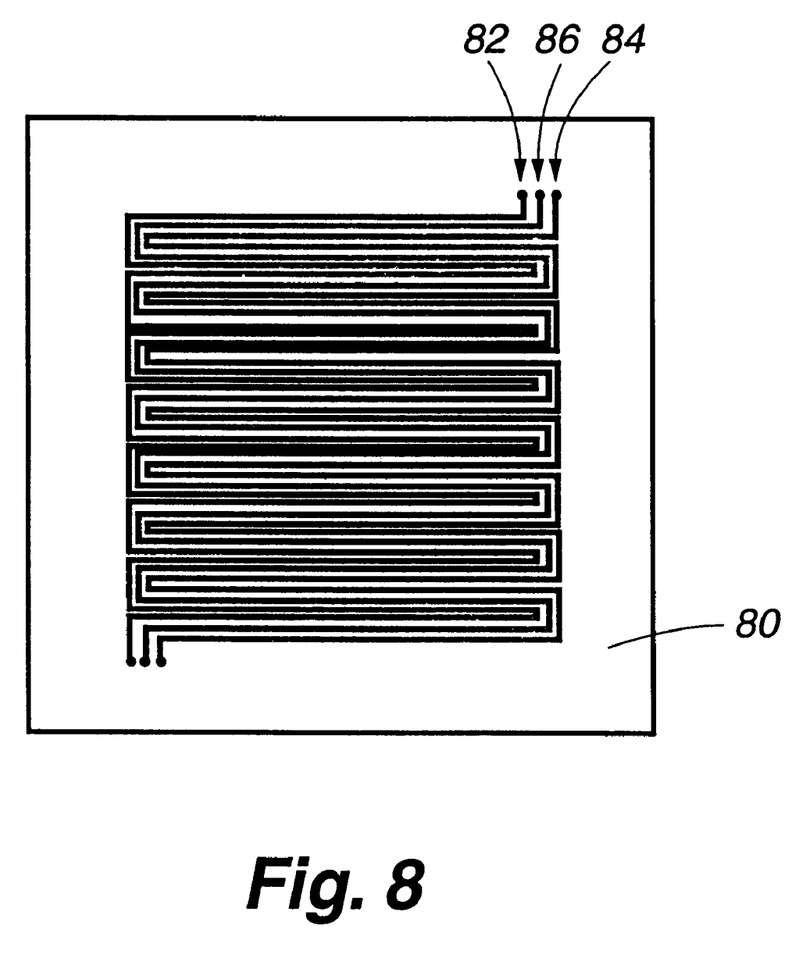
FIG. 8 is a planar view of a distribution plate having serpentine distribution channels for liquid water and fuel gas on one side of the plate.

The system for supplying the water to the wicking backing can be further simplified by placing the hydrogen and liquid water channels in the same plane. This also decreases the amount of space required for the anode flow structure, which decreases the pitch of the unit cell and increases the power density of the stack. A 50 cm$^2$ active area $H_2/H_2O$ anode flow-field plate 80 that accommodates both reactant gas and water flow-channels in this manner is shown in FIG. 8. Three channels 82, 84, 86 are formed in a conventional serpentine arrangement. The middle channel 86 is manifolded to carry water and the other two channels 82, 84 to carry reactant gas. The three channels are preferable to two because this arrangement prevents water channel 86 from doubling back on itself. Since two hydrogen channels 82, 84 are always flanking water channel 86, the diffusion pathways for the reactants are over only a single water-filled channel. It will be understood that more than three channels may be provided where a larger area fuel cell is contemplated. But it is desirable to have each water channel flanked by gas channels so that no water channel is adjacent another water channel in the serpentine flow path.

Figure 9:
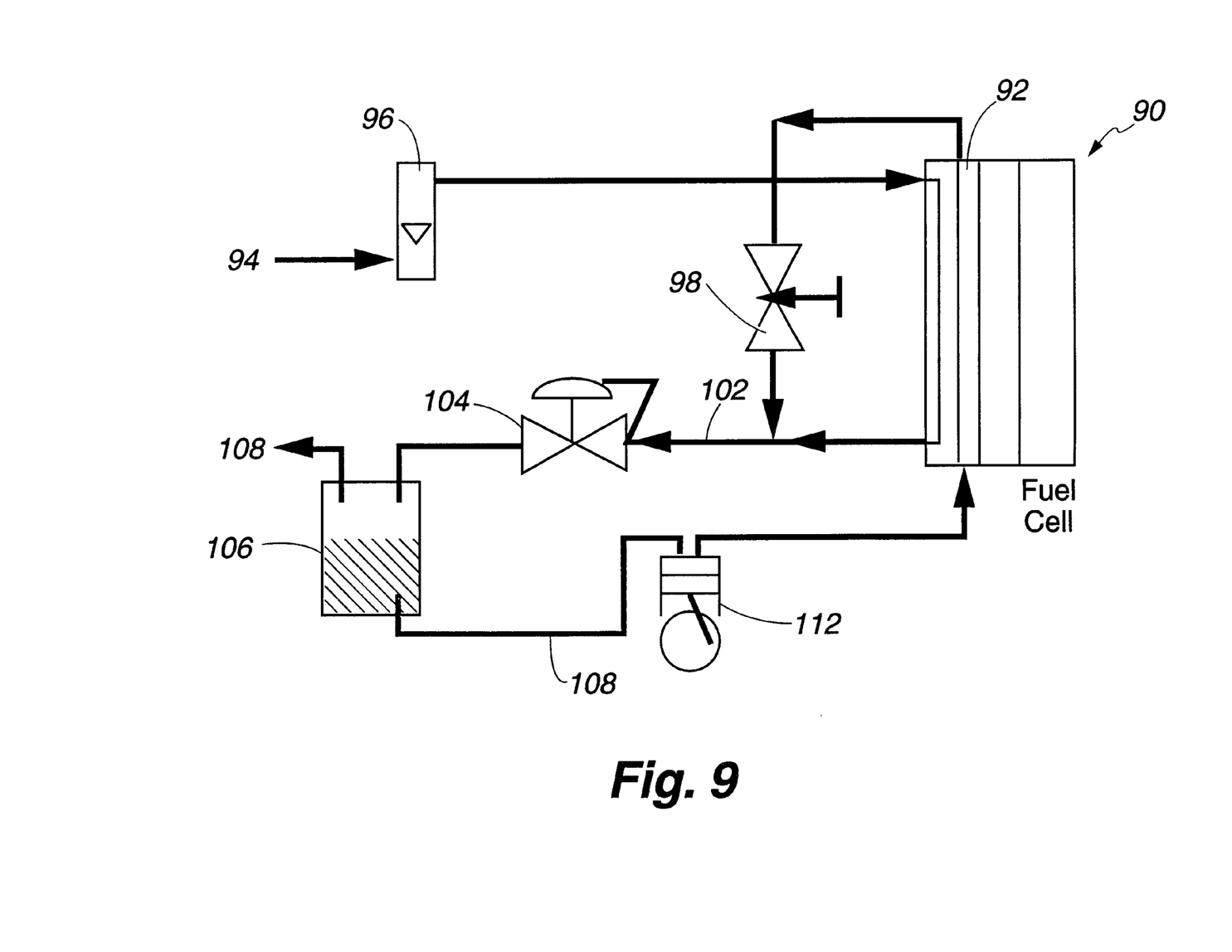
FIG. 9 is a schematic for a recirculating system for liquid water injection into the anode side of a fuel cell.

In contrast to the earlier embodiments, the 50 cm² experimental cell 90 has a channel on anode side 92 that is dedicated to the liquid water, which also separates the two flow-streams, as shown in FIG. 9. To operate the cell, a separate recycleable flow loop is thus provided for the water. Pump 112 is used as before to inject water 108 into anode side 92 of cell 90, albeit through the separate H₂O channel. Fuel gas 94 is provided through meter 96 to the separate gas channels for anode side 92. Needle valve 98 (or a second back pressure regulator) is used on the stack effluent side 102 of the water loop in order to pressurize the water stream slightly compared to the reactant gasses. This discourages the gases from infiltrating into the higher pressure water channel in order to assure that the water channel remains continuously filled with liquid throughout. Effluent 102 is provided through back-pressure regulator 104 to reservoir 106, where fuel gas 108 is separated from effluent water that is returned to reservoir 106.

Figure 10:
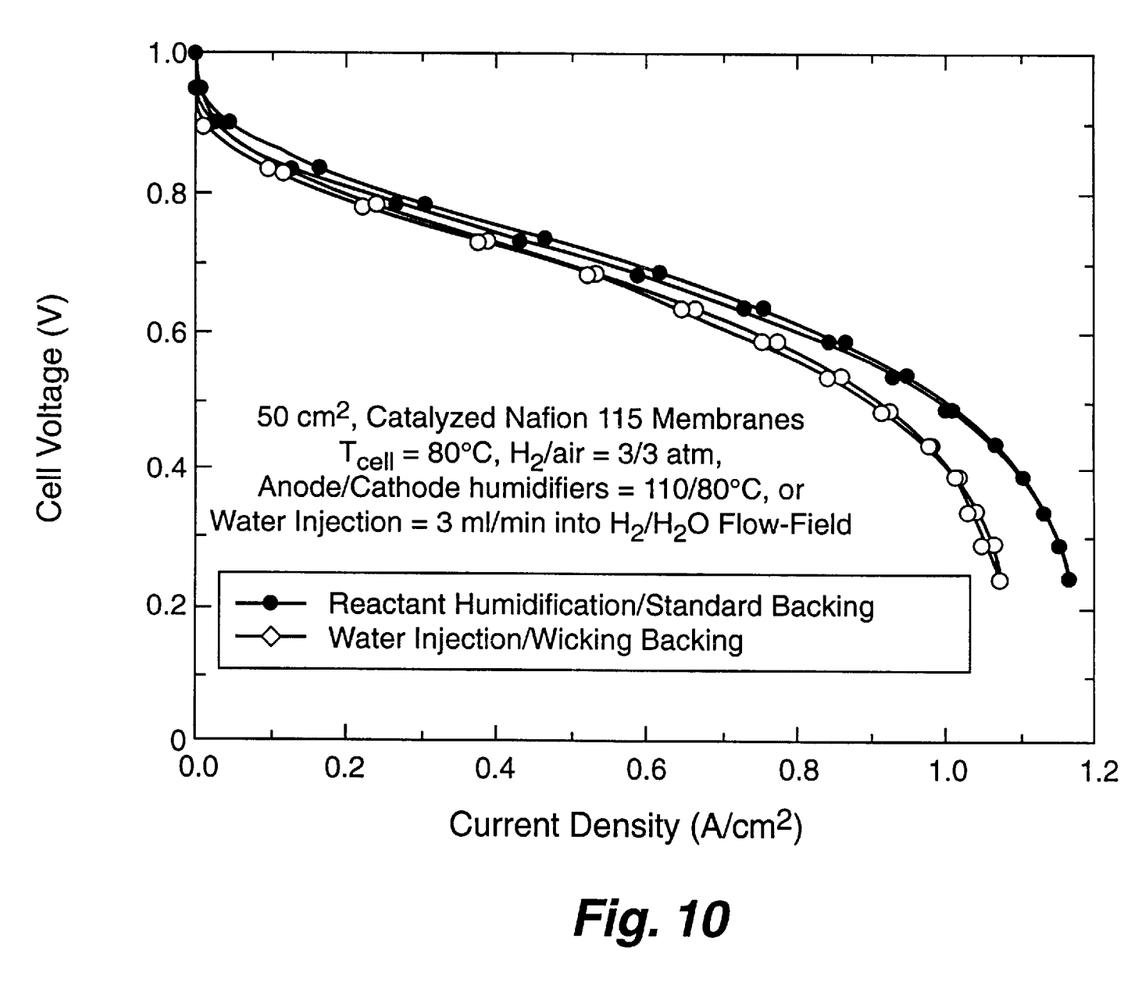
FIG. 10 is a performance comparison of relatively large area cells for conventional humidification of the reactant gases and liquid water injection water into the anode side of a fuel cell.

The polarization curves for two Nafion 115-based 50 cm² active area cells are compared in FIG. 10. One is a standard cell with conventional reactant humidification (open circles), the other utilizes a separate water channel in the anode flow-field as described above as well as a wicking anode backing (closed circles). As in the case of the smaller cells (FIG. 3), the system shown in FIG. 9 that delivers liquid water directly to the membrane outperforms the otherwise similar conventional cell over the entire current density range. With the continuously filled water channel it was necessary to pump only about 3 ml/min into the special plate, and even less would have sufficed as a fair amount of the water was wicked over the ribs separating the water from the hydrogen channels. This can be prevented by selectively applying the plenum side of the wicking over only the water channel. The wicking on the membrane side of the backing ideally still will span the hydrogen channels to supply the liquid water in these areas.

More important than the increase in performance demonstrated by the wicking backing/H₂—H₂O anode flow field in the comparison of the two non-optimized systems is the demonstration of a relatively simple hydration approach from a systems perspective. De-coupling the water and gas supply subsystems simplifies the optimization of stack performance. Eliminating humidifier modules decreases system volume and improves response. The system described herein essentially requires only a pump and a water reservoir, which are required for most hydration schemes anyway. Conceivably, a stack system could be yet further simplified by combining the stack cooling with the hydration system by pumping a sufficient amount of cooled water through the hydration channels in the anode plate to remove the excess heat generated by the fuel cell stack.

This general approach is not only useful for fuel cells, but it possesses advantages for certain electrochemical reactors where both gaseous and liquid components may need access to or from the catalyst and/or membrane.

In summary, a very simple means is provided to maintain the polymer electrolyte membrane in direct contact with liquid water to assure optimal hydration over all types of conditions and current densities. It has demonstrated effectiveness at higher operating temperatures and is probably beneficial under ambient pressure conditions. This approach results in a fuel cell hydration system that is low-cost, compact, simple, versatile (applicable to a variety of off-the-shelf membrane products and electrode technologies), and enhances performance.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A polymer electrolyte membrane fuel cell assembly having an anode side and a cathode side separated by said membrane and generating electrical current by electrochemical reactions between a fuel gas and an oxidant, wherein said anode side comprises:
    a distribution plate supplying said fuel gas and liquid water;
    a hydrophobic gas diffusion backing with one side contacting said distribution plate and another side contacting said membrane; and
    a hydrophilic wick passing through said hydrophobic gas diffusion backing wherein said liquid water is wicked from said distribution plate to said membrane.

2. A fuel cell assembly according to claim 1, wherein said hydrophilic wick is distributed over said gas diffusion backing.

3. A fuel cell assembly according to claim 1, wherein said hydrophilic wick is formed from hydrophilic thread that is sewn through said gas diffusion backing.

4. A fuel cell assembly according to any one of claims 1, 2, or 3, wherein said distribution plate includes separate distribution channels for said fuel gas and said liquid water.

5. A fuel cell assembly according to claim 4, wherein said distribution channels are at least three channels arranged on one side of said distribution plate with each liquid water channel flanked by two gas channels and said channels are configured in a serpentine pattern on said distribution plate.

6. A fuel cell assembly according to claim 4, where said distribution plate is formed of a porous hydrophilic material and said gas distribution channels are adjacent said gas diffusion backing on a first side of said distribution plate and said liquid water distribution channels are on a second side of said distribution plate opposed to said first side.

7. A fuel cell assembly according to claim 4, where said distribution plate is formed of a porous hydrophobic material and said liquid water distribution channels are adjacent said gas diffusion backing on a first side of said distribution plate and said gas distribution channels are on a second side of said distribution plate opposed to said first side.

8. A fuel cell assembly according to claim 1, further including:
    a liquid water supply, and
    a pump connecting said liquid water supply to said anode side of said fuel cell assembly.

9. A fuel cell assembly according to claim 8, further including a separator for retaining liquid water that exits with said fuel gas from said anode side of said fuel cell.

* * * * *